United States Patent
Li et al.

(10) Patent No.: US 8,438,426 B2
(45) Date of Patent: May 7, 2013

(54) FLEXIBLE BUS ARCHITECTURE FOR MONITORING AND CONTROL OF BATTERY PACK

(75) Inventors: Guoxing Li, Sunnyvale, CA (US); Xiaojun Zeng, Shanghai (CN); Anquan Xiao, Shanghai (CN); Xiaohua Hou, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 13/572,193

(22) Filed: Aug. 10, 2012

(65) Prior Publication Data

US 2012/0303997 A1     Nov. 29, 2012

Related U.S. Application Data

(63) Continuation of application No. 13/154,736, filed on Jun. 7, 2011, now Pat. No. 8,261,129, which is a continuation of application No. 12/872,432, filed on Aug. 31, 2010, now Pat. No. 8,015,452.

(51) Int. Cl.
*G06F 11/00*      (2006.01)

(52) U.S. Cl.
USPC ............................. 714/43; 714/22; 320/116

(58) Field of Classification Search .................. 714/4.5, 714/43; 320/122, 126
See application file for complete search history.

(56) References Cited

U.S. PATENT DOCUMENTS

| | | |
|---|---|---|
| 4,580,261 A | 4/1986 | Pelotte |
| 4,716,354 A | 12/1987 | Hacker |
| 4,723,241 A | 2/1988 | Grobel et al. |
| 4,773,005 A | 9/1988 | Sullivan |
| 4,962,378 A | 10/1990 | Fadem |
| 5,282,193 A | 1/1994 | Iino et al. |
| 5,423,050 A | 6/1995 | Taylor et al. |
| 5,504,413 A | 4/1996 | Fernandez et al. |

(Continued)

FOREIGN PATENT DOCUMENTS

| | | |
|---|---|---|
| CN | 1319189 A | 10/2001 |
| CN | 101202463 A | 6/2008 |

(Continued)

OTHER PUBLICATIONS

Office Action of corresponding TW application, issued on Feb. 19, 2013.

(Continued)

*Primary Examiner* — Philip Guyton
(74) *Attorney, Agent, or Firm* — Wang Law Firm, Inc.; Li K. Wang; Stephen Hsu

(57) ABSTRACT

A method for diagnosing a control system for a stacked battery. The control system comprises a plurality of processors, a plurality of controllers, and a monitoring unit (control unit). The method comprises sending a diagnostic information from the central unit to a top processor of the plurality of processors, transmitting a return information from the top processor of the plurality of processors to the central unit, comparing the diagnostic information sent from the central unit with the return information received by the central unit, and indicating a communication problem if the diagnostic information sent from the central unit is different from the return information received by the central unit. The steps are repeated by eliminating the top processor from a previous cycle and assigning a new top processor if there is no problem with the reconfigurable communication system.

20 Claims, 11 Drawing Sheets

U.S. PATENT DOCUMENTS

| | | | |
|---|---|---|---|
| 5,701,068 A | 12/1997 | Baer et al. | |
| 5,841,996 A | 11/1998 | Nolan et al. | |
| 5,850,351 A | 12/1998 | Lotfy et al. | |
| 5,974,475 A | 10/1999 | Day et al. | |
| 5,998,967 A | 12/1999 | Umeki et al. | |
| 6,031,354 A | 2/2000 | Wiley et al. | |
| 6,094,053 A | 7/2000 | Harvey | |
| 6,172,479 B1 | 1/2001 | Barton | |
| 6,281,684 B1 | 8/2001 | James | |
| 6,404,166 B1 | 6/2002 | Puchianu | |
| 6,462,510 B1 | 10/2002 | Takada et al. | |
| 6,611,774 B1 | 8/2003 | Zaccaria | |
| 6,762,588 B2 | 7/2004 | Miyazaki | |
| 7,020,076 B1 | 3/2006 | Alkalai et al. | |
| 7,023,845 B1 | 4/2006 | Simons et al. | |
| 7,034,540 B2 | 4/2006 | Anzawa et al. | |
| 7,466,104 B2 | 12/2008 | Wang | |
| 7,489,030 B2 | 2/2009 | Shibata et al. | |
| 7,511,457 B2 | 3/2009 | Emori et al. | |
| 7,615,966 B2 | 11/2009 | Houldsworth et al. | |
| 7,733,059 B2 * | 6/2010 | Yoshida | 320/118 |
| 7,760,106 B2 | 7/2010 | Vandensande et al. | |
| 8,022,669 B2 * | 9/2011 | Li | 320/122 |
| 8,227,944 B2 | 7/2012 | Li | |
| 8,237,405 B2 | 8/2012 | Li | |
| 2001/0037482 A1 | 11/2001 | Plants | |
| 2004/0019441 A1 | 1/2004 | Larson | |
| 2004/0164706 A1 | 8/2004 | Osborne | |
| 2004/0225810 A1 | 11/2004 | Hiratsuka | |
| 2004/0251874 A1 | 12/2004 | Petitdidier et al. | |
| 2005/0275389 A1 | 12/2005 | Cordoba | |
| 2006/0072262 A1 | 4/2006 | Paik et al. | |
| 2006/0136609 A1 | 6/2006 | Vladimir | |
| 2006/0259280 A1 | 11/2006 | Zaccaria | |
| 2007/0182377 A1 | 8/2007 | Vandensande | |
| 2009/0144471 A1 | 6/2009 | Lin | |
| 2010/0259221 A1 | 10/2010 | Tabatowski-Bush | |
| 2011/0012638 A1 | 1/2011 | Shuler, Jr. | |
| 2011/0140533 A1 | 6/2011 | Zeng | |
| 2011/0289239 A1 | 11/2011 | Zeng | |
| 2011/0309799 A1 | 12/2011 | Firehammer | |
| 2011/0313613 A1 | 12/2011 | Kawahara et al. | |
| 2012/0013201 A1 * | 1/2012 | Pariseau et al. | 307/125 |

FOREIGN PATENT DOCUMENTS

| | | | |
|---|---|---|---|
| JP | 11-206025 A | 7/1999 |
| JP | 2001-307782 A | 11/2001 |
| JP | 2003-111297 A | 4/2003 |
| JP | 2005-033951 A | 2/2005 |
| JP | 2007-158237 A | 6/2007 |
| JP | 2007-252175 A | 9/2007 |
| JP | 2009-027916 A | 2/2009 |
| WO | 9527358 A1 | 10/1995 |
| WO | 0005596 A1 | 2/2000 |
| WO | 2006068429 A1 | 6/2006 |

OTHER PUBLICATIONS

Office Action of corresponding CN application, issued on Mar. 5, 2013.

Notice of Allowance for U.S. Appl. No. 12/836,632, issued on Feb. 12, 2013.

* cited by examiner

US 8,438,426 B2

FLEXIBLE BUS ARCHITECTURE FOR MONITORING AND CONTROL OF BATTERY PACK

RELATED APPLICATION

The present application is a continuation application of co-pending U.S. patent application Ser. No. 13/154,736, filed on Jun. 7, 2011, which itself is continuation application of U.S. patent application Ser. No. 12/872,432, filed on Aug. 31, 2010, now U.S. Pat. No. 8,015,452.

BACKGROUND OF THE INVENTION

1. Field of the Invention

The present invention generally relates to a reconfigurable bus architecture, and more specifically, relates to a reconfigurable bus architecture for a battery application.

2. Description of the Related Art

In battery management, it is necessary to monitor the status of a battery, such as each cell voltage, pack voltage and each cell environment temperature, by Analog Front End (AFE) devices or analog to digital converter. The analog front end device is coupled to the battery. The digital data will be transferred to a microprocessor for various purposes, such as OCV (Open Circuit Voltage), cell impedance tracking, SOC (State of Charge), SOH (State of Health), cell balance, coulomb counting or protection purpose due to OV (Over Voltage)/UV (Under Voltage), OT (Over Temperature)/UT (Under Temperature), or OC (Over Current)/SC (Short Circuit).

With increasing the number of the cells of the stacked battery, the voltage of the stacked battery will become higher and higher. Further, the voltage capacity of an analog front end device is limited by the pin count of the AFE device or the physical process breakdown voltage of the AFE device. In this case, only one analog front end device is not enough to monitor the whole stacked battery. A plurality of analog front end devices is needed to monitor the status of the stacked battery. As consequence, the operation of these analog front end devices and their interaction with the stacked battery become more complex. These devices communicate with each other through several different buses and efficient management of these devices becomes an issue for stack battery efficiency.

Therefore, there is a need for a flexible bus architecture that can be used in a stacked battery that enables efficient management of the analog front end devices.

SUMMARY OF THE INVENTION

In one embodiment, the present invention provides a method for diagnosing a control system for a stacked battery. The control system comprises a central unit in communication with a plurality of processors and a plurality of controllers, the plurality of processors being coupled in series and each processor being in communication with a controller. The method comprises sending a diagnostic information from the central unit to a top processor of the plurality of processors, transmitting a return information from the top processor of the plurality of processors to the central unit, comparing the diagnostic information sent from the central unit with the return information received by the central unit, and indicating a communication problem if the diagnostic information sent from the central unit is different from the return information received by the central unit. The steps are repeated by eliminating the top processor from a previous cycle and assigning a new top processor if there is no problem with the reconfigurable communication system.

The present system and methods are therefore advantageous as they enable identification of abnormal information access behaviors or abnormal information access flow. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

Figure 1:
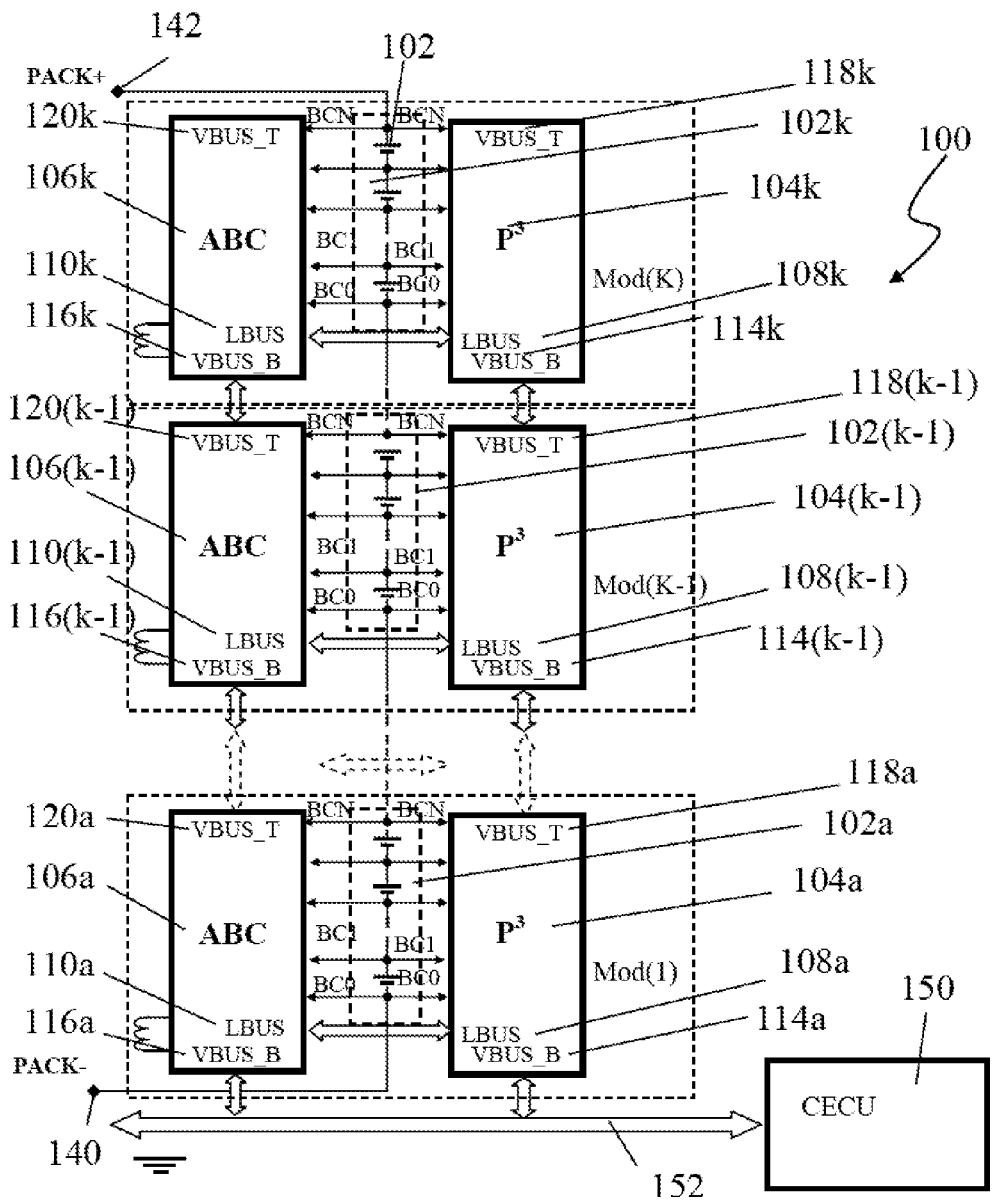
FIG. 1 depicts a control system according to one embodiment of the present invention.

FIG. 1 illustrates a flexible bus architecture for a control system 100 for a stacked battery 102 according to one embodiment of the present invention. The stacked battery 102 comprises a plurality of battery modules or packs 102a, ... 102(k−1), and 102k, which are stacked in series so as to provide electric power with high voltage to an electric device, such as an inverter/electric motor in an electric vehicle (EV) or a hybrid electric vehicle (HEV). The battery cell in the battery packs can be Lithium-Ion battery, NiMH battery, Lead Acid battery, Fuel Cell or Super Capacitor, etc.

A plurality of processors ($P^3$) 104a, ... 104(k−1), and 104k are coupled to the plurality of battery packs 102a, ... 102(k−1), and 102k, respectively. Each of the processors 104a, ... 104(k−1), and 104k comprises analog-to-digital converters (ADCs), not shown, which are coupled to each of the battery cells in the battery packs 102a, ... 102(k−1), and 102k. The processors 104a, ... 104(k−1), and 104k can monitor the voltage and temperature of each of the battery cells in the battery packs 102a, ... 102(k−1), and 102k through the ADCs.

A plurality of active balancing controllers (ABC) 106a, ... 106(k−1), and 106k are coupled to the plurality of battery packs 102a, ... 102(k−1), and 102k, respectively.

During operation, particularly during discharging, the active balancing controller 106*a*, . . . 106(*k*–1), and 106*k* can use an inductor to transfer the energy from one or more cells to the weakest one. Each of the active balancing controllers 106*a*, . . . 106(*k*–1), and 106*k* further comprises a respective lateral bus interface (LBus) 110*a*, . . . 110(*k*–1), or 110*k*. Each of the processors 104*a*, . . . 104(*k*–1), and 104*k* comprises a respective lateral bus interface (LBus) 108*a*, . . . 108(*k*–1), or 108*k*. The lateral bus interfaces 110*a*, . . . 110(*k*–1), and 110*k* of the active balancing controllers 106*a*, . . . 106(*k*–1), and 106*k* are respectively coupled to the lateral bus interfaces 108*a*, . . . 108(*k*–1), and 108*k* of the processors 104*a*, . . . 104(*k*–1), and 104*k* so as to communicate with each other. The lateral bus interfaces 110*a*, . . . 110(*k*–1), and 110*k* of the active balancing controllers 106*a*, . . . 106(*k*–1), and 106*k* and the lateral bus interfaces 108*a*, . . . 108(*k*–1), and 108*k* of the processors 104*a*, . . . 104(*k*–1), and 104*k* can be CMOS logic circuit and be formed as an open-drain topology so as to drive the IO logic low and IO logic high by the pull-up resistor, not shown.

Each of the processors 104*a*, . . . 104(*k*–1), and 104*k* comprises a respective vertical bottom bus interface (VBus_B) 114*a*, . . . 114(*k*–1), or 114*k* and a respective vertical top bus interface (VBus_T) 118*a*, . . . 118(*k*–1), or 118*k*. For the adjacent two processors, the vertical top bus interface of the lower processor is coupled to the vertical bottom bus interface of the upper processor so as to communicate with each other. Taking the processor 104(*k*–1) and the processor 104*k* as an example, the vertical top bus interface 118(*k*–1) of the processor 104(*k*–1), i.e., the lower processor, is coupled to the vertical bottom bus interface 114*k* of the processor 104*k*, i.e., the upper processor.

Each of the active balancing controllers 106*a*, . . . 106(*k*–1), and 106*k* comprises a respective vertical bottom bus interface (VBus_B) 116*a*, . . . 116(*k*–1), or 116*k* and a respective vertical top bus interface (VBus_T) 120*a*, . . . 120(*k*–1), or 120*k*. For the adjacent two active balancing controllers, the vertical top bus interface of the lower active balancing controller is coupled to the vertical bottom bus interface of the upper active balancing controller so as to communicate with each other. Taking the active balancing controller 106(*k*–1) and the active balancing controller 106*k* as an example, the vertical top bus interface 120(*k*–1) of the active balancing controller 106(*k*–1), i.e., the lower processor, is coupled to the vertical bottom bus interface 116*k* of the active balancing controller 106*k*, i.e., the upper processor.

The control system 100 further comprises a central electronic control unit (CECU) 150. The central electronic control unit 150 communicates with the vertical bottom bus interface 114*a* of the lowest processor 104*a* in the control system 100 and the vertical bottom bus interface 116*a* of the lowest active balancing controller 106*a* in the control system 100 through a common bus 152.

In this architecture, during operation, the central electronic control unit 150 can access anyone of the active balancing controllers 106*a*, . . . 106(*k*–1), and 106*k* through the vertical buses. When the central electronic control unit 150 needs to access a specific active balancing controller, e.g., the active balancing controller 106(*k*–1), the central electronic control unit 150 will send the command signals to the lowest active balancing controller 106*a* through the common bus 152 and the vertical bottom bus interface 116*a*. The command signals will be passed to the vertical top bus interface 120*a* through the internal level shifters and control logic, not shown, of the active balancing controller 106*a*. Then the command signals are transmitted to the upper vertical bottom bus interface of the upper active balancing controller. By similar transmission approach, the central electronic control unit 150 is able to access all the active balancing controllers 106*a*, . . . 106(*k*–1), and 106*k*. There are two modes to respond to the command signals from the central electronic control unit 150, when the active balancing controllers 106*a*, . . . 106(*k*–1), and 106*k* receive the command signals. In one mode, the central electronic control unit 150 can ask all of the active balancing controllers 106*a*, . . . 106(*k*–1), and 106*k* to respond to the command signal. In the other mode, the central electronic control unit 150 will provide a specific address in the command signal so as to specify one active balancing controller to respond to the command signal.

Similarly, the central electronic control unit 150 can also access all the processors 104*a*, . . . 104(*k*–1) and 104*k* through the vertical buses. The monitoring voltages or temperatures of the processor 104*a*, . . . 104(*k*–1) and 104*k* can also be transmitted to the central electronic control unit 150 by similar approach.

The lateral bus interfaces 110*a*, . . . 110(*k*–1), and 110*k* of the active balancing controllers 106*a*, . . . 106(*k*–1), and 106*k* and the lateral bus interfaces 108*a*, . . . 108(*k*–1), and 108*k* of the processors 104*a*, . . . 104(*k*–1), and 104*k* normally are in idle state, which means in data receiving state (slave state). Any one of the lateral bus interfaces 110*a*, . . . 110(*k*–1), and 110*k* of the active balancing controllers 106*a*, . . . 106(*k*–1), and 106*k* and the lateral bus interfaces 108*a*, . . . 108(*k*–1), and 108*k* of the processors 104*a*, . . . 104(*k*–1), and 104*k* can be configured as master state when receiving a command from the central electronic control unit 150 such that the one of the lateral bus interfaces 110*a*, . . . 110(*k*–1), and 110*k* of the active balancing controllers 106*a*, . . . 106(*k*–1), and 106*k* and the lateral bus interfaces 108*a*, . . . 108(*k*–1), and 108*k* of the processors 104*a*, . . . 104(*k*–1), and 104*k* can send command or data to the corresponding slave device via the lateral bus. For example, when the central electronic control unit 150 sends a command to the processor 104*a* for actuating/activating or instructing the processor 104*a* to send data to the active balancing controller 106*a* via the lateral bus interface 108*a* and the lateral bus interface 110*a*, the processor 104*a* will configure the lateral bus interface 108*a* to be in master state and then start the data transmission to the active balancing controller 106*a* at once. Alternatively, the active balancing controller 106*a* will configure the lateral bus interface 110*a* to be in master state and then start the data transmission to the processor 104*a*.

Alternatively, if the processor 104*a*, . . . 104(*k*–1) or 104*k* or the active balancing controllers 106*a*, . . . 106(*k*–1), or 106*k* detects any error conditions, the corresponding lateral bus interface 110*a*, . . . 110(*k*–1), or 110*k* or the corresponding lateral bus interface 108*a*, . . . 108(*k*–1), or 108*k* can be actuated/activated. The error conditions include, but are not limited to, watch-dog time out, less bus line actuated than normal, wrong internal level-shifting feedback, and bus data integrity check error. For example, the condition of less bus line actuated than normal can include that, if the bus lines comprises a clock line and a data line, only one line is toggling and the other is always locked to one level. Further, as mentioned above, the signals received by the vertical bottom bus interface will be mapped to the vertical top bus interface through the internal level shifters and control logic. If the level-shifting is not working properly, the condition will actuate/activate the corresponding lateral bus. In addition, the bus data integrity check error, for example, can be Packet Error Check (PEC) error or Error Checking and Correcting (ECC) error.

According to another embodiments of the present invention, the control system 100 can access all of the processor 104*a*, . . . 104(*k*–1) and 104*k* and the active balancing controllers 106a, . . . 106(k−1), and 106k through the vertical top and bottom bus interfaces. When any one of the vertical buses is in error, the corresponding lateral buses will be actuated/ activated and the control system 100 can access any one of the processor 104a, . . . 104(k−1) and 104k and the active balancing controllers 106a, . . . 106(k−1), and 106k through the vertical buses and the lateral buses. For example, if the vertical top bus interface 118(k−1) of the processor 104(k−1) is in error, the central electronic control unit 150 cannot access the processor 104k through the vertical top bus interface 118 (k−1) of the processor 104(k−1) and the vertical bottom bus interface 114k of the processor 104k. The lateral bus interface 110k of the active balancing controller 106k, and the lateral bus interface 108k of the processor 104k will be actuated/ activated. In this case, the central electronic control unit 150 can access the processor 104k through the lateral bus interface 110k of the active balancing controller 106k, and the lateral bus interface 108k of the processor 104k. In other words, the central electronic control unit 150 and the processor 104k can communicate with each other through the active balancing controller 106k in sequence. Under this architecture, the control system 100 according to the embodiment of the present invention is formed as an H-type bus and provides redundancy communication As mentioned above, the control system 100 according to the embodiment of the present invention provides great redundancy. In the bus path, even there are multiple breakpoints, the communication is still working properly.

Figure 2:
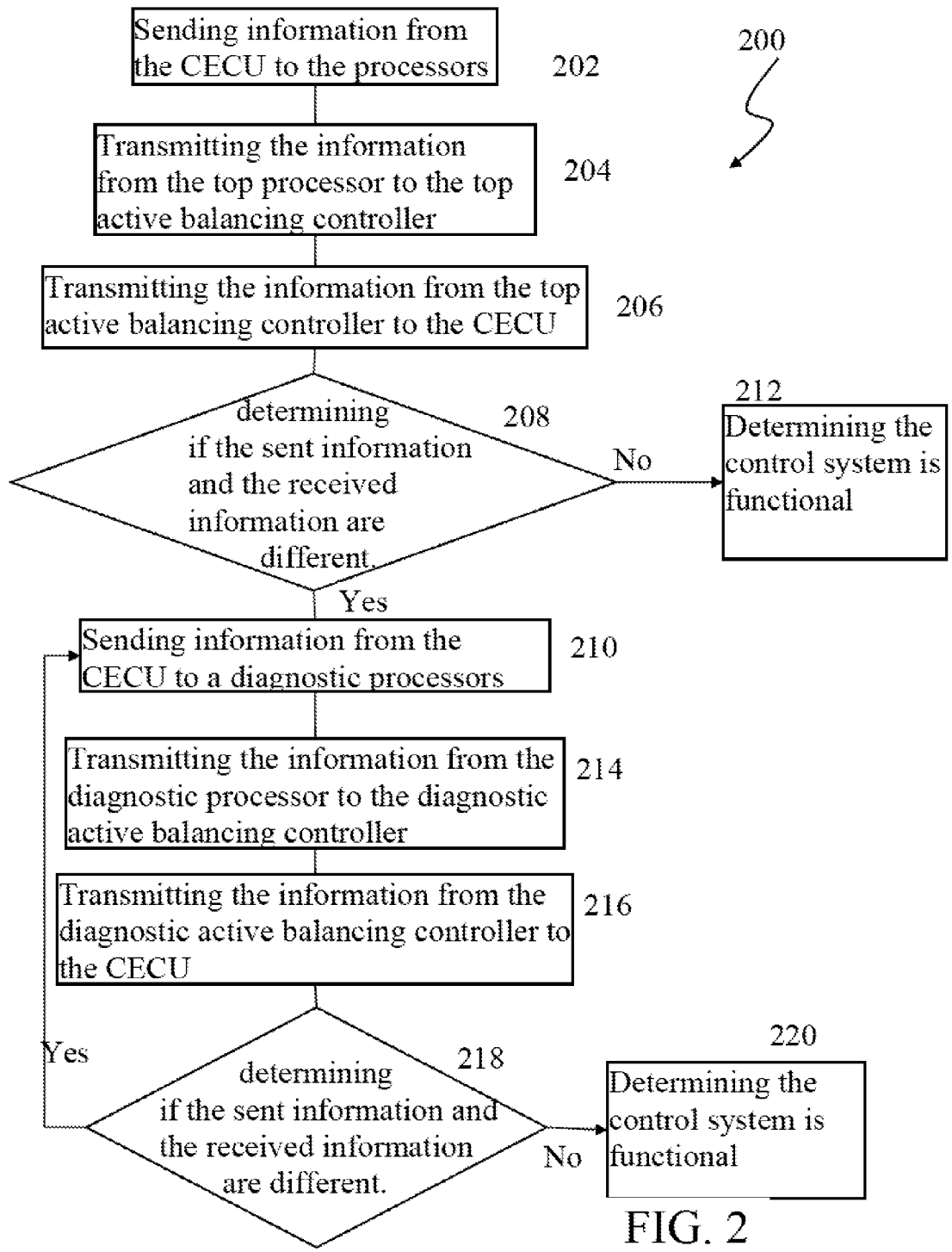
FIG. 2 depicts a method for self-diagnostic through loop-back according to one embodiment of the present invention.

Under this architecture, the control system 100 also provides a self-diagnostic function to detect the failure of the vertical or lateral buses. FIG. 2 illustrates a method 200 for self-diagnostic through loop-back according to one embodiment of the present invention. In step 202 of the self-diagnostic method 200, information is sent from the central electronic control unit 150 through every processor 104a, . . . and 104 (k−1) to the top processor 104k. In step 204, the information is transmitted from the top processor 104k to the top active balancing controller 106k through the top lateral bus interfaces 108k and 110k. In step 206, the information can be looped back from the top active balancing controller 106k to the top processor 104k through the top lateral bus interfaces 108k and 110k, then to the central electronic control unit 150 through every processor from 104(k−1), . . . to 104a, i.e., from the processor 104(k−1) to the bottom processor 104a. In step 208, the information sent from the central electronic control unit 150 and the information received by the central electronic control unit 150 are compared. If the received information is different from the sent information, go to step 210, and if not, go to step 212. In step 212, it is determined that the control system 100 is working properly. In step 210, the information is sent from the central electronic control unit 150 to the diagnostic processor which is one level lower than the previous processor through the processor series. In step 214, the information is transmitted from the diagnostic processor in step 210 to the diagnostic active balancing controller, which is at the same level with the diagnostic processor, through the corresponding lateral buses. In step 216, the information is transmitted from the diagnostic active balancing controller to the central electronic control unit 150 through the active balancing controllers. In step 218, the information sent from the central electronic control unit 150 and the information received by the central electronic control unit 150 are compared. If the received information is different from the sent information, go to the 210 again, and if not, go to 220. In step 220, it is determined that the communication buses, the processors and the active balancing controllers lower than the diagnostic processor and the diagnostic active balancing controller are in working condition.

According to other embodiment of the present invention, processes or steps similar to those disclosed in the self-diagnostic method 200 can be executed to eliminate any one of the processors 104a, . . . 104(k−1) and 104k and active balancing controllers 106a, . . . 106(k−1), and 106k so as to determine whether any bus interface of any processor or active balancing controller is in working condition.

Furthermore, the architecture of the control system 100 also provides a great flexibility to expand. If any circuit or IC, such as a secondary protection circuit, comprises the similar lateral bus interface and complies with the same lateral bus protocol, and it can be coupled to the processors and communicate with the central electronic control unit 150.

Figure 3:
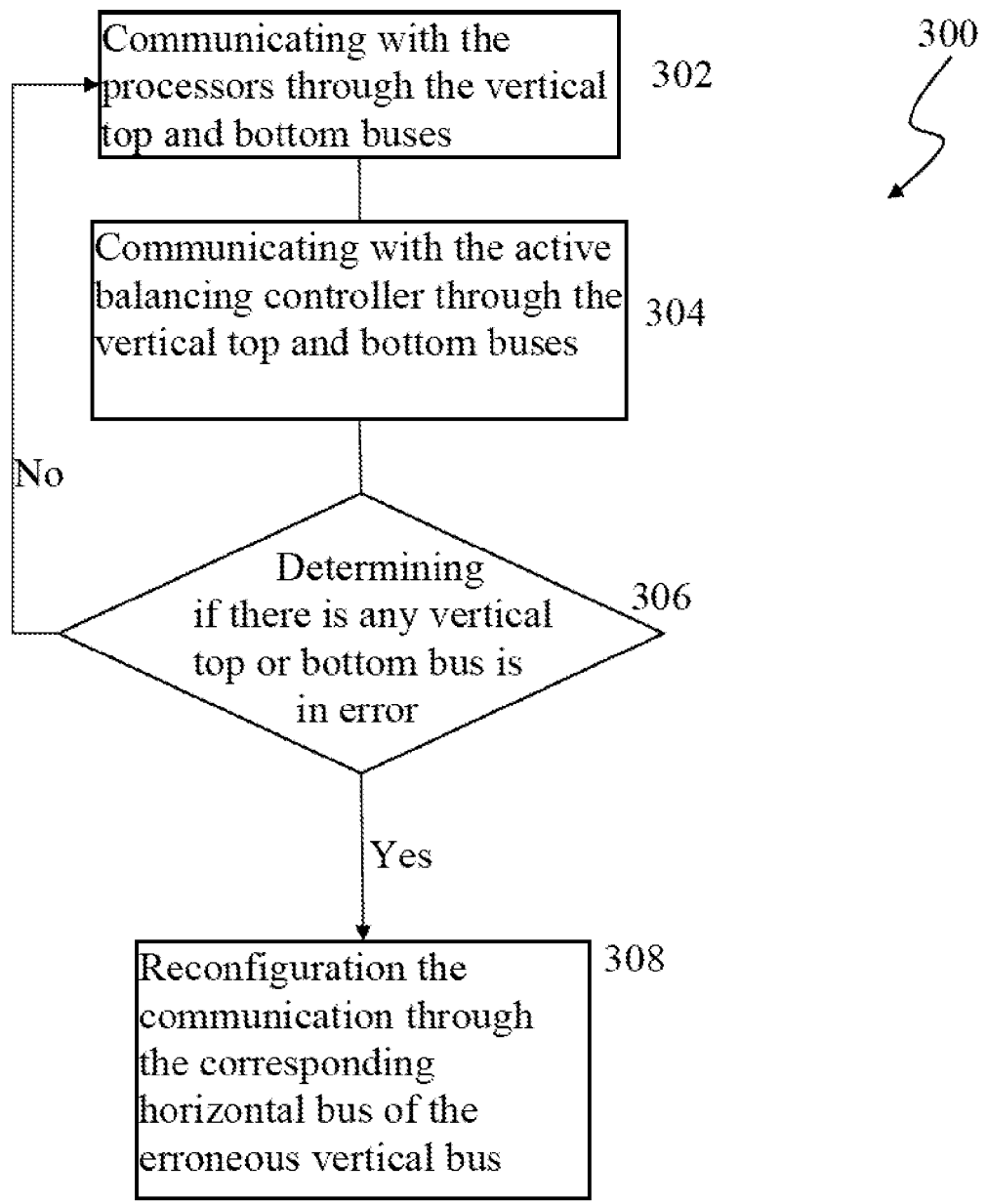
FIG. 3 depicts a method for reconfiguring a control system according to another embodiment of the present invention.

Under this architecture, the control system 100 also provides a reconfiguring function to communicate with the processors 104a, . . . 104(k−1) and 104k and the active balancing controllers 106a, . . . 106(k−1), and 106k. Referring to FIG. 3, it illustrates a method 300 for reconfiguring the control system 100 according to an embodiment of the present invention. In step 302, the central electronic control unit 150 of the control system 100 is communicating with the processors 104a, . . . 104(k−1) and 104k through the vertical top bus interfaces 118a, . . . 118(k−2) and/or 118(k−1) and the vertical bottom bus interfaces 114a, . . . 114(k−1) and/or 114k thereof. In step 304, the central electronic control unit 150 is communicating with the active balancing controllers 106a, . . . 106 (k−1), and 106k through the vertical top bus interfaces 120a, . . . 120(k−2) and/or 120(k−1) and the vertical bottom bus interfaces 116a, . . . 116(k−1) and/or 116k thereof. In step 306, the central electronic control unit 150 detects and determines if there is any vertical top or bottom bus interface is in error. A possible way for the central electronic control unit 150 to detect a problem in the communication to an active balancing controller or a processor is when the central electronic control unit 150 is not receiving battery information, such as voltage, and temperature, from a particular processor. Another possible way for the central electronic control unit 150 to detect a communication problem with an active balancing controller is when a particular battery pack is not adjusting its load despite of instructions sent by the central electronic control unit 150.

If there is no problem, the control system 100 goes back to 302, and if yes, goes to 308. In step 308, the control system 100 actuates/activates the two corresponding lateral buses of the error vertical bus so as to reconfigure the communication. If the vertical top bus interface is in error, the lateral bus at the same level with the erroneous vertical top bus interface and the lateral bus at one level higher than the erroneous vertical top bus interface are actuated/activated. If the vertical bottom bus interface is in error, the lateral bus at the same level with the erroneous vertical bottom bus interface and the lateral bus at one level lower than the erroneous vertical bottom bus interface are actuated/activated.

Figure 4:
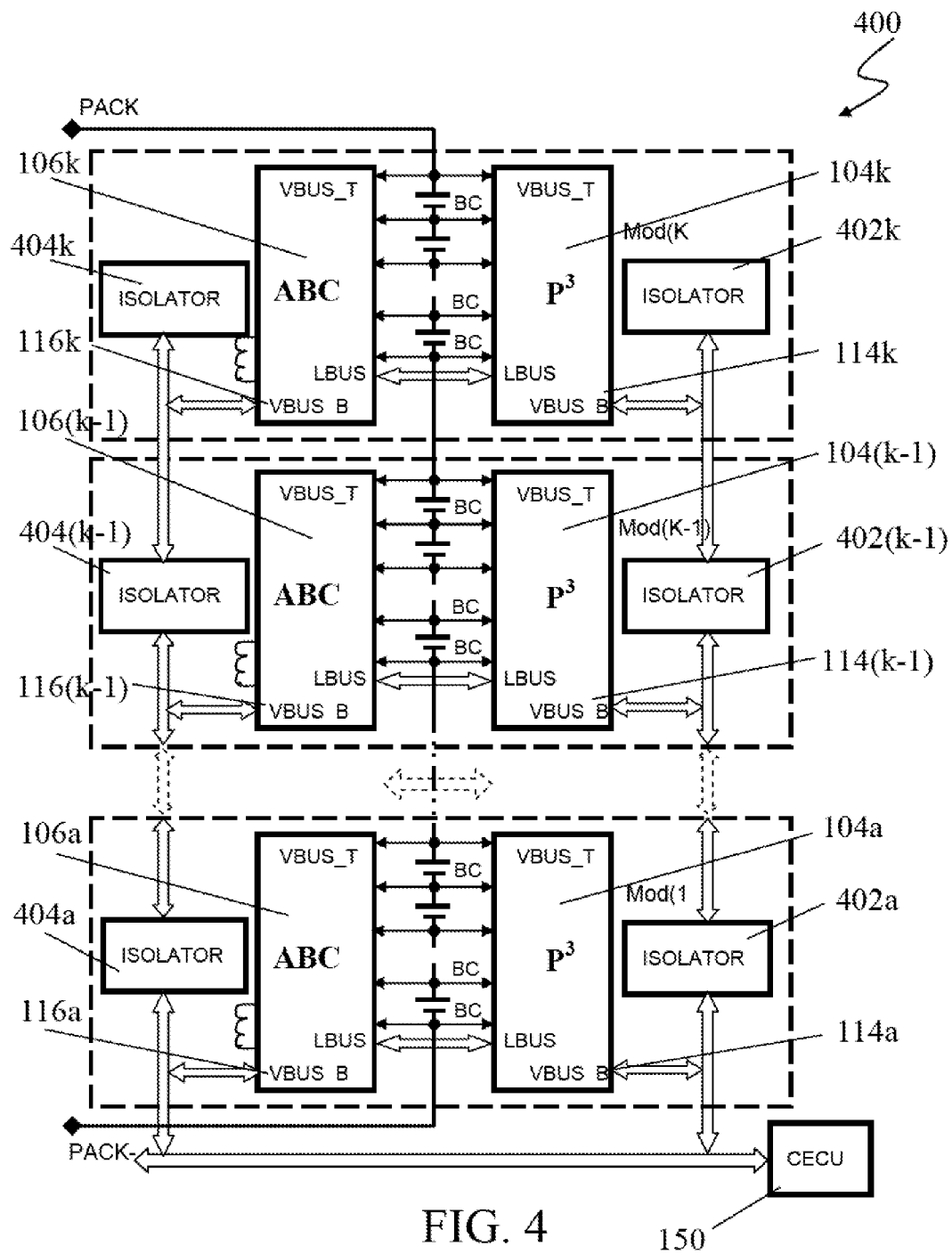
FIG. 4 depicts a control system with two sets of isolators according to another embodiment of the present invention.

Referring to FIG. 4, it illustrates a control system 400 according to one embodiment of the present invention. The control system 400 shown in FIG. 4 is similar to the control system 100 shown in FIG. 1, and similar elements are indicated with same reference numerals. The control system 400 comprises a first set of plurality of isolators 402a, . . . 402 (k−1) and 402k and a second set of plurality of isolators 404a, . . . 404(k−1) and 404k. The first set of isolators 402a, . . . 402(k−1) and 402k are coupled to each other in series or in the cascade connection, and comprises level shifters and voltage isolators, not shown. The vertical bottom bus interfaces 114a, . . . 114(k−1) and 114k of the processors

104a, . . . 104(k−1), and 104k are coupled to the first set of isolator 402a, . . . 402(k−1) and 402k. As shown in FIG. 4, the central electronic control unit 150 can access all the processors 104a, . . . 104(k−1), and 104k through the isolators 402a, . . . 402(k−1) and 402k and the vertical bottom bus interfaces 114a, . . . 114(k−1) and 114k of the processors 104a, . . . 104(k−1), and 104k. Similarly, the second set of isolator 404a, . . . 404(k−1) and 404k are coupled to each other in series and comprises level shifters and voltage isolators, not shown. The vertical bottom bus interfaces 116a, . . . 116(k−1) and 116k of the active balancing controllers 106a, . . . 106(k−1), and 106k are coupled to the second set of isolator 404a, . . . 404(k−1) and 404k. As shown in FIG. 4, the central electronic control unit 150 can access all the active balancing controllers 106a, . . . 106(k−1), and 106k through the isolators 404a, . . . 404(k−1) and 404k and the vertical bottom bus interfaces 116a, . . . 116(k−1) and 116k of the active balancing controllers 106a, . . . 106(k−1), and 106k. The control system 400 according to one embodiment of the present invention is also formed as an H-type bus and provides redundancy communication.

Figure 5:
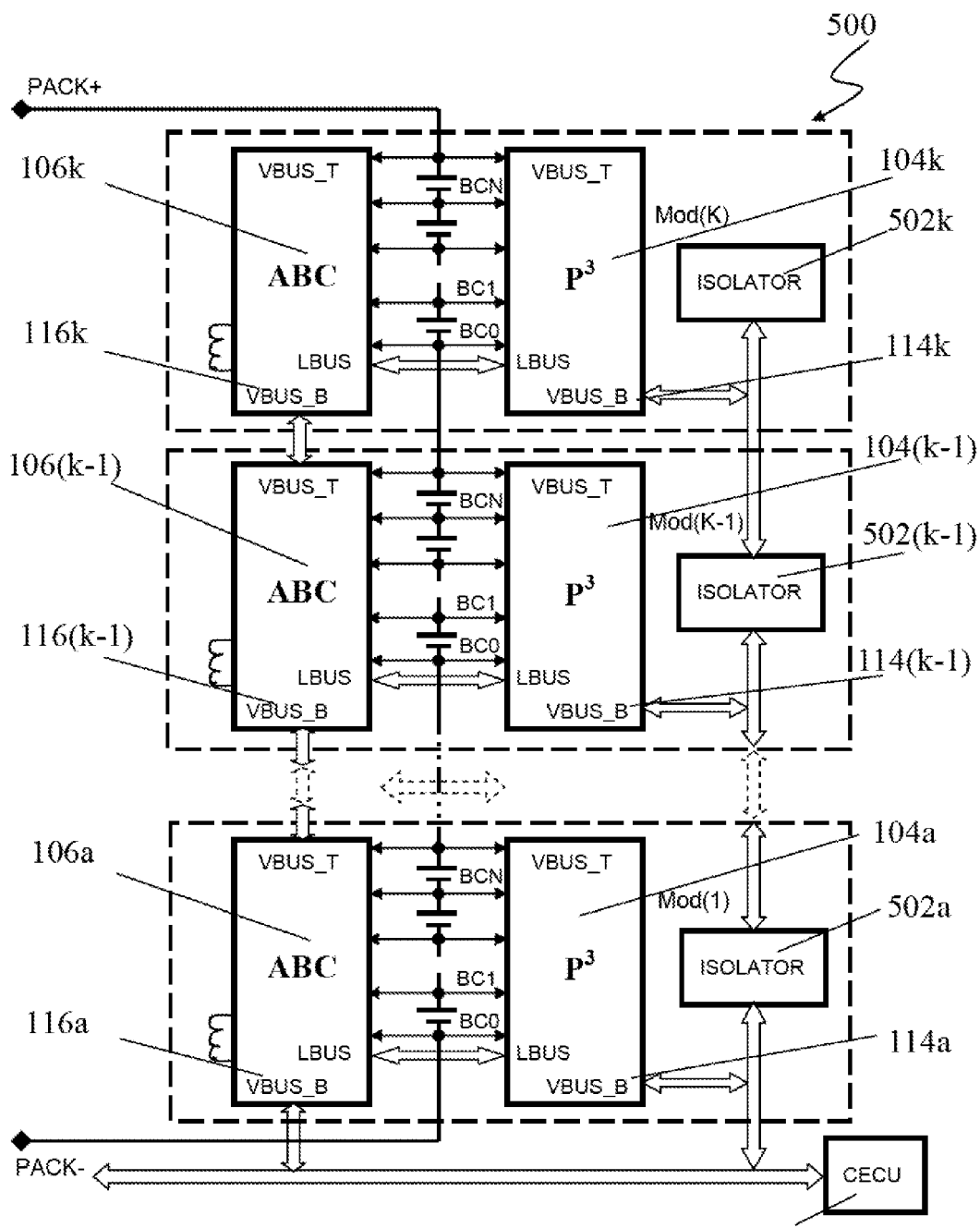
FIG. 5 depicts a control system with one set of isolators according to another embodiment of the present invention.
Figure 6:
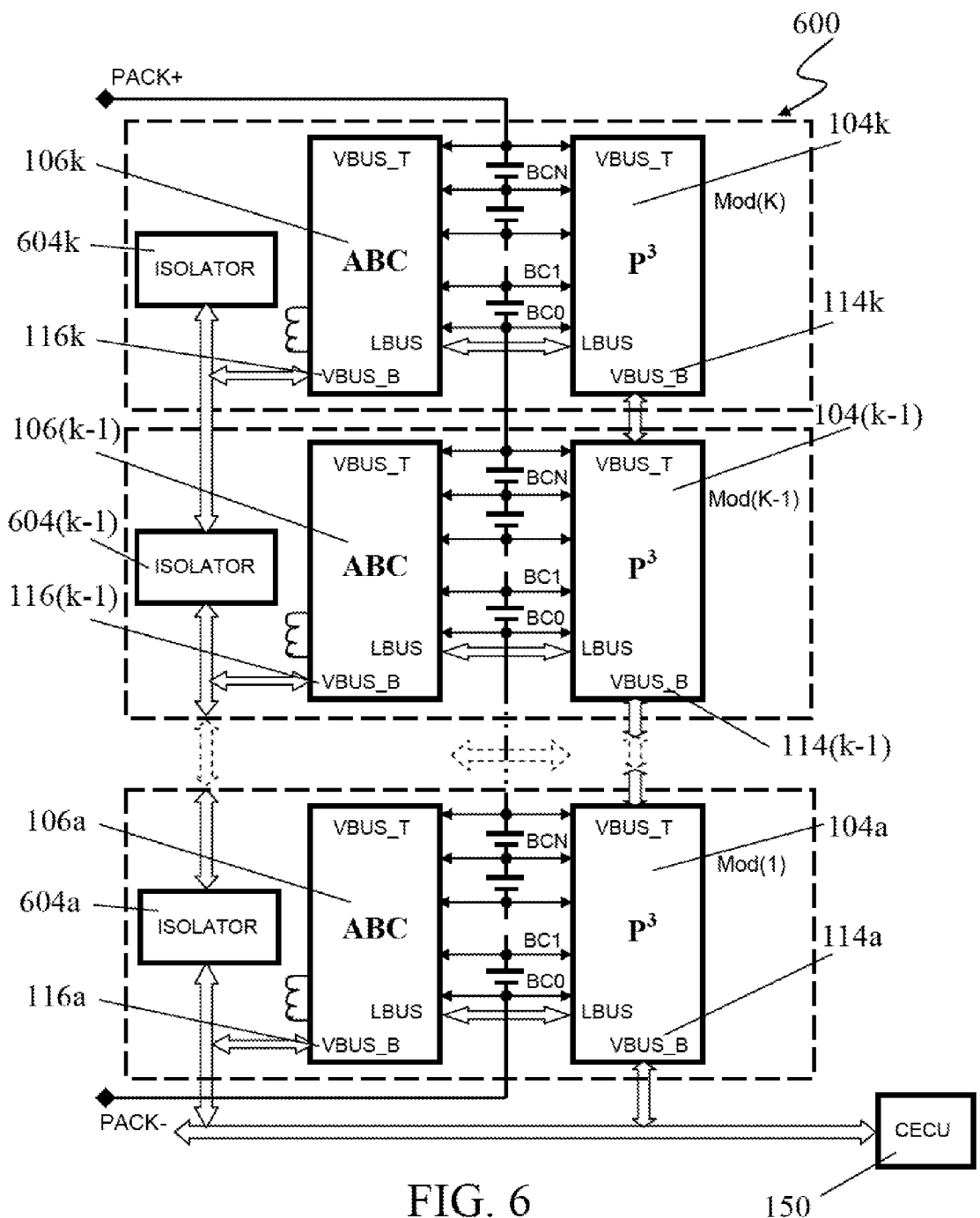
FIG. 6 depicts a control system with one set of isolators according to another embodiment of the present invention.

Referring to FIG. 5 and FIG. 6, they illustrate a control system 500 and a control system 600 according to embodiments of the present invention. The control system 500 and the control system 600 shown in FIG. 5 and FIG. 6 are similar to the control system 400 shown in FIG. 4, and similar elements are indicated with same reference numerals. The control system 500 in the FIG. 5 only comprises a set of plurality of isolators 502a, . . . 502(k−1) and 502k which are coupled to the vertical bottom bus interfaces 114a, . . . 114(k−1) and 114k of the processors 104a, . . . 104(k−1), and 104k. As shown in FIG. 5, the central electronic control unit 150 can access all the processors 104a, . . . 104(k−1), and 104k through the isolators 502a, . . . 502(k−1) and 502k and the vertical bottom bus interfaces 114a, . . . 114(k−1) and 114k of the processors 104a, . . . 104(k−1), and 104k. The control system 600 in the FIG. 6 only comprises a set of plurality of isolators 604a, . . . 604(k−1) and 604k which are coupled to the vertical bottom bus interfaces 116a, . . . 116(k−1) and 116k of the active balancing controllers 106a, . . . 106(k−1), and 106k. As shown in FIG. 6, the central electronic control unit 150 can access all the active balancing controllers 106a, . . . 106(k−1), and 106k through the isolators 604a, . . . 604(k−1) and 604k and the vertical bottom bus interfaces 116a, . . . 116(k−1) and 116k of the active balancing controllers 106a, . . . 106(k−1), and 106k. The control system 500 and the control system 600 according to the embodiments of the present invention are also formed as an H-type bus and provide redundancy communication.

Figure 7:
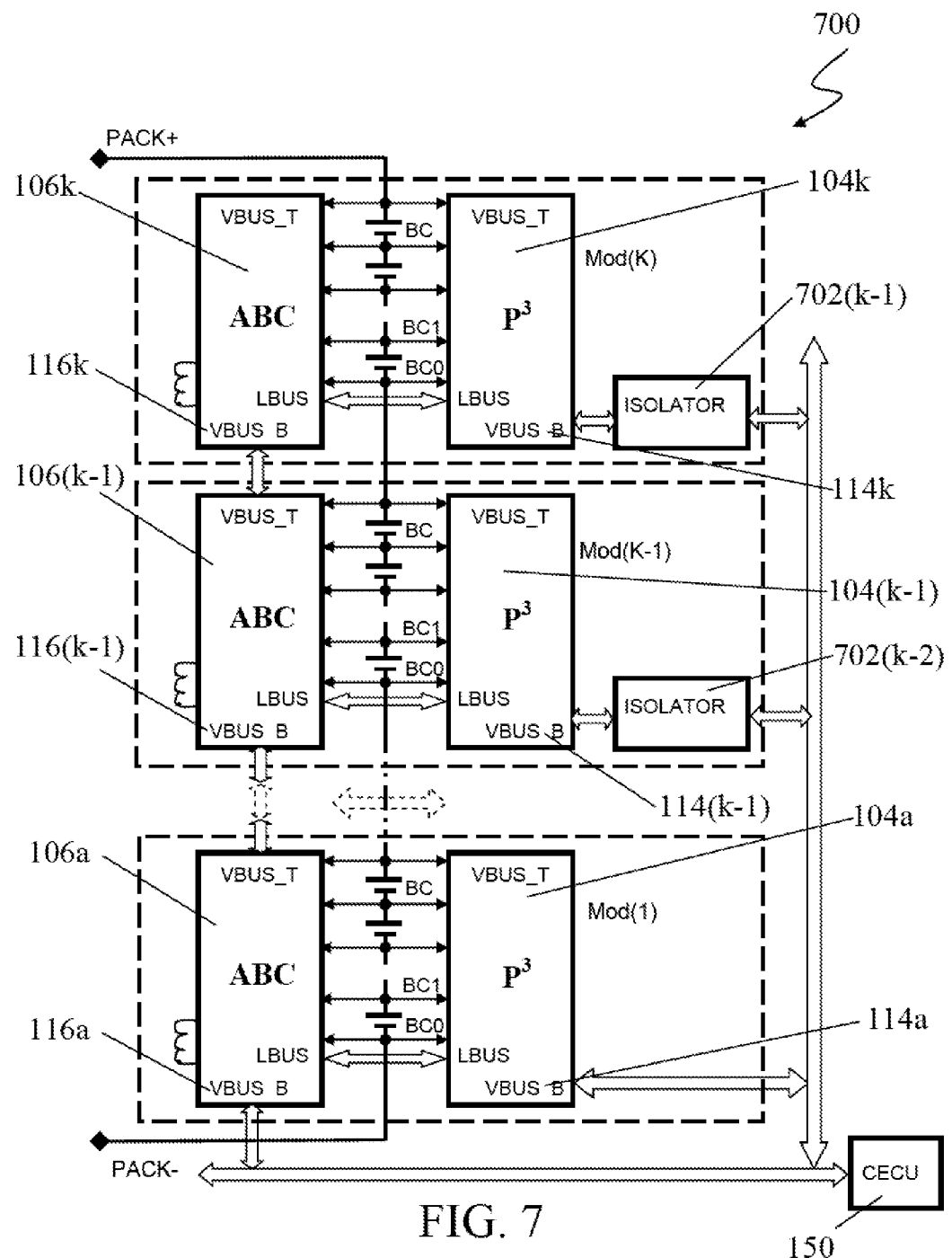
FIG. 7 depicts a control system with isolators in the star connection according to another embodiment of the present invention.

Referring to FIG. 7, it illustrates a control system 700 according to another embodiment of the present invention. The control system 700 shown in FIG. 7 is similar to the control system 100 shown in FIG. 1, and similar elements are indicated with same reference numerals. The control system 700 in the FIG. 7 comprises a set of a plurality of isolators 702a, . . . 702(k−2) and 702(k−1) which are coupled to the vertical bottom bus interfaces 114b, . . . 114(k−1) and 114k of the processors 104b, . . . 104(k−1), and 104k. The plurality of isolators 702a, . . . 702(k−2) and 702(k−1) and the central electronic control unit 150 are coupled to each other in a star connection, which means each of the processors 104a, . . . 104(k−1), and 104k is directly connected to the central electronic control unit 150 through a bus. The isolators 702a, . . . 702(k−1) and 702(k−1) are needed because of voltage difference in the signals from the vertical bottom bus interfaces 114a, . . . 114(k−1) and 114k of the processor 104a, . . . 104(k−1), and 104k. As shown in FIG. 7, the central electronic control unit 150 can access all the processors 104a, . . . 104(k−1), and 104k through the isolators 702a, . . . 702(k−2) and 702(k−1) and the vertical bottom bus interfaces 114a, . . . 114(k−1) and 114k of the processors 104a, . . . 104(k−1), and 104k. The communication between the central electronic control unit 150 and active balancing controllers 106a, . . . 106(k−1), and 106k are through the vertical bottom bus interfaces (VBus_B) 116a, . . . 116(k−1), and 116k and the vertical top bus interfaces (VBus_T) 120a, . . . 120(k−1), and 120k of the active balancing controllers 106a, . . . 106(k−1), and 106k. If the communication between one active balancing controller 106(i) and an adjacent active balancing controller 106(i+1) is broken, the information can be re-routed from the active balancing controller 106(i) to the corresponding processor 104(i) and back to the next processor 104(i+1) and then to the active balancing controller 106(i+1). The control system 700 according to the embodiment of the present invention is also formed as an H-type bus and provides redundancy communication.

Figure 8:
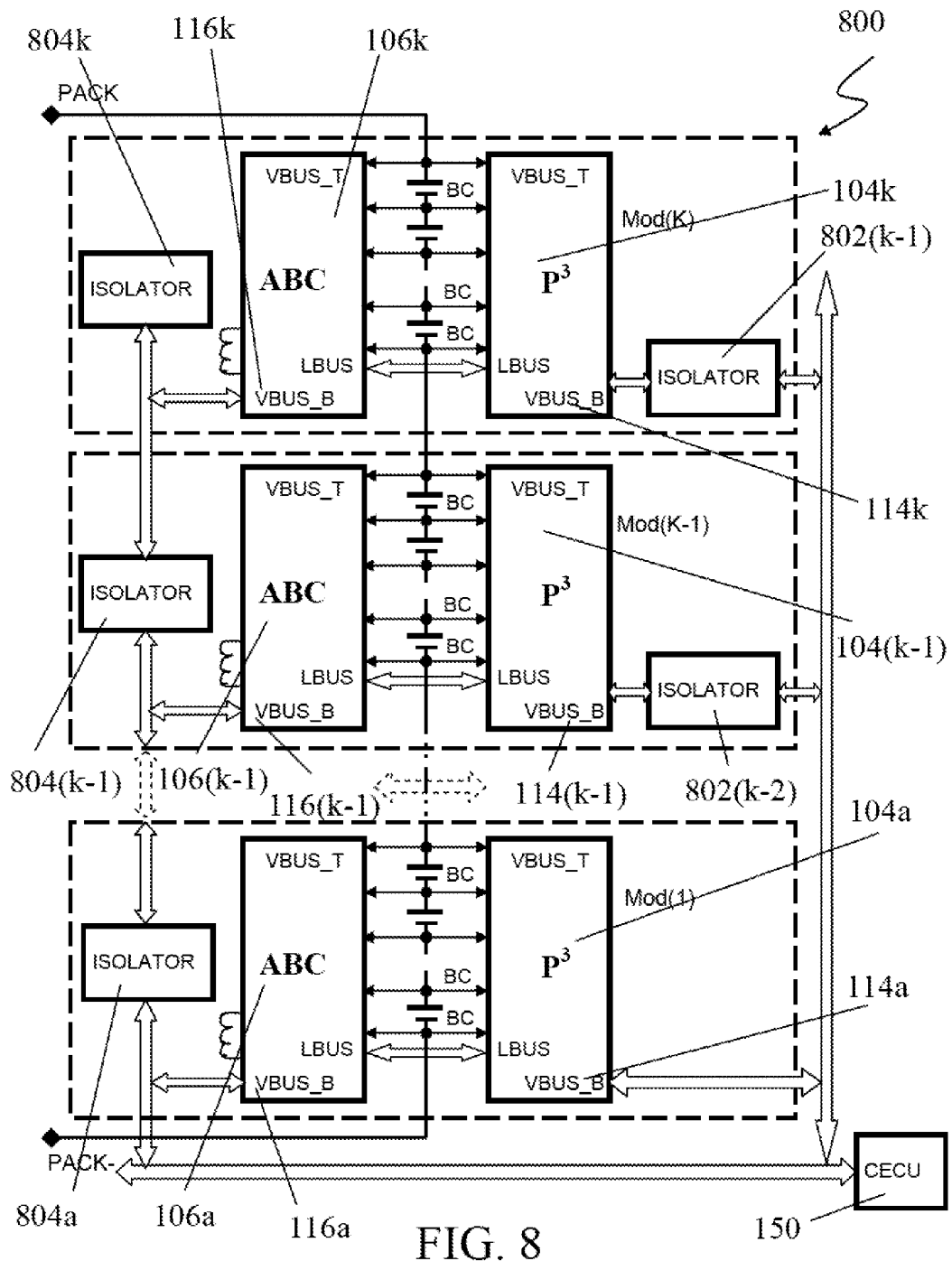
FIG. 8 depicts a control system with two set of isolators according to another embodiment of the present invention.

Referring to FIG. 8, it illustrates a control system 800 according to another embodiment of the present invention. The control system 800 shown in FIG. 8 is similar to the control system 700 shown in FIG. 7, and similar elements are indicated with same reference numerals. The control system 800 in the FIG. 8 comprises a first set of a plurality of isolators 802a, . . . 802(k−2) and 802(k−1) which are coupled to the vertical bottom bus interfaces 114b, . . . 114(k−1) and 114k of the processors 104b, . . . 104(k−1), and 104k, and a second set of a plurality of isolators 804a, . . . 804(k−1) and 804k which are coupled to the vertical bottom bus interfaces 116a, . . . 116(k−1) and 116k of the active balancing controllers 106a, . . . 106(k−1), and 106k. The first set of isolators 802a, . . . 802(k−2) and 802(k−1) are coupled to each other in the star connection. The second set of isolators 804a, . . . 804(k−1) and 804k are coupled to each other in the cascade connection. As shown in FIG. 8, the central electronic control unit 150 can access all the processors 104a, . . . 104(k−1), and 104k through the isolators 802a, . . . 802(k−2) and 802(k−1) and the vertical bottom bus interfaces 114a, . . . 114(k−1) and 114k of the processors 104a, . . . 104(k−1), and 104k. Similarly, the communication between the central electronic control unit 150 and active balancing controllers 106a, . . . 106(k−1), and 106k are through the second set of isolators 804a, . . . 804(k−1) and 804k and the vertical bottom bus interfaces (VBus_B) 116a, . . . 116(k−1), and 116k of the active balancing controllers 106a, . . . 106(k−1), and 106k. If the communication between one active balancing controller 106(i) and an adjacent active balancing controller 106(i+1) or between one isolator 804(i) and an adjacent isolator 804(i+1) and is broken, the information can be re-routed from the isolator 804(i) via the active balancing controller 106(i) to the corresponding processor 104(i) and back to the next processor 104(i+1) and then to the active balancing controller 106(i+1). The control system 800 according to the embodiment of the present invention is also formed as an H-type bus and provides redundancy communication.

Figure 9:
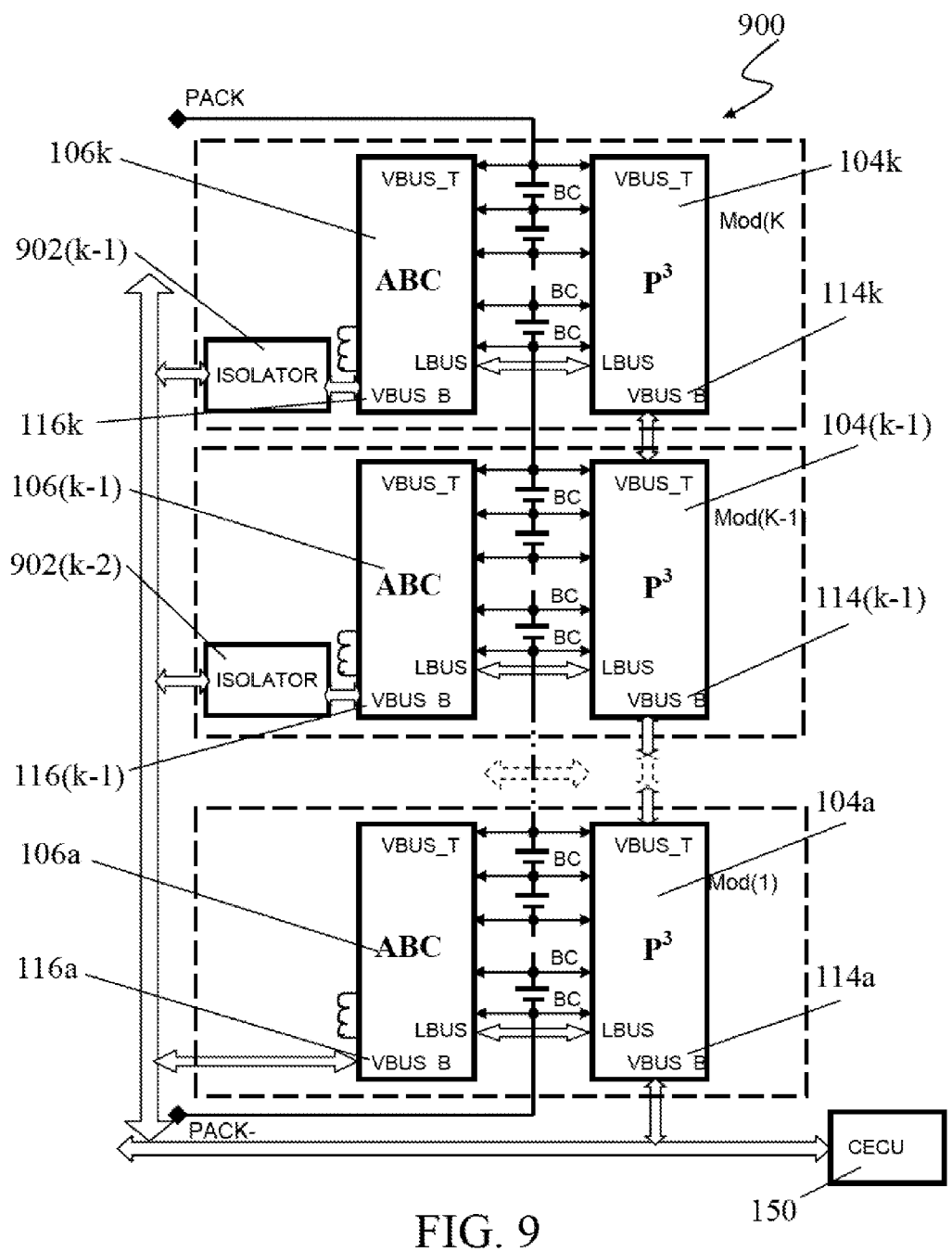
FIG. 9 depicts a control system with isolators in the star connection according to another embodiment of the present invention.

Referring to FIG. 9, it illustrates a control system 900 according to another embodiment of the present invention. The control system 900 shown in FIG. 9 is similar to the control system 700 shown in FIG. 7, and similar elements are indicated with same reference numerals. The control system 900 in the FIG. 9 comprises a set of a plurality of isolators 902a, . . . 902(k−2) and 902(k−1) which are coupled to the vertical bottom bus interfaces 116b, . . . 116(k−1) and 116k of the active balancing controllers 106b, . . . 106(k−1), and 106k. The plurality of isolators 902a, . . . 902(k−2) and 902(k−1) and the central electronic control unit 150 are coupled to each other in a star connection. As shown in FIG. 9, the central electronic control unit 150 can access all the active balancing controllers 106a, . . . 106(k–1), and 106k through the isolators 902a, . . . 902(k–2) and 902(k–1) and the vertical bottom bus interfaces 116a, . . . 116(k–1) and 116k of the active balancing controllers 106a, . . . 106(k–1), and 106k. The control system 900 according to the embodiment of the present invention is also formed as an H-type bus and provides redundancy communication.

Figure 10:
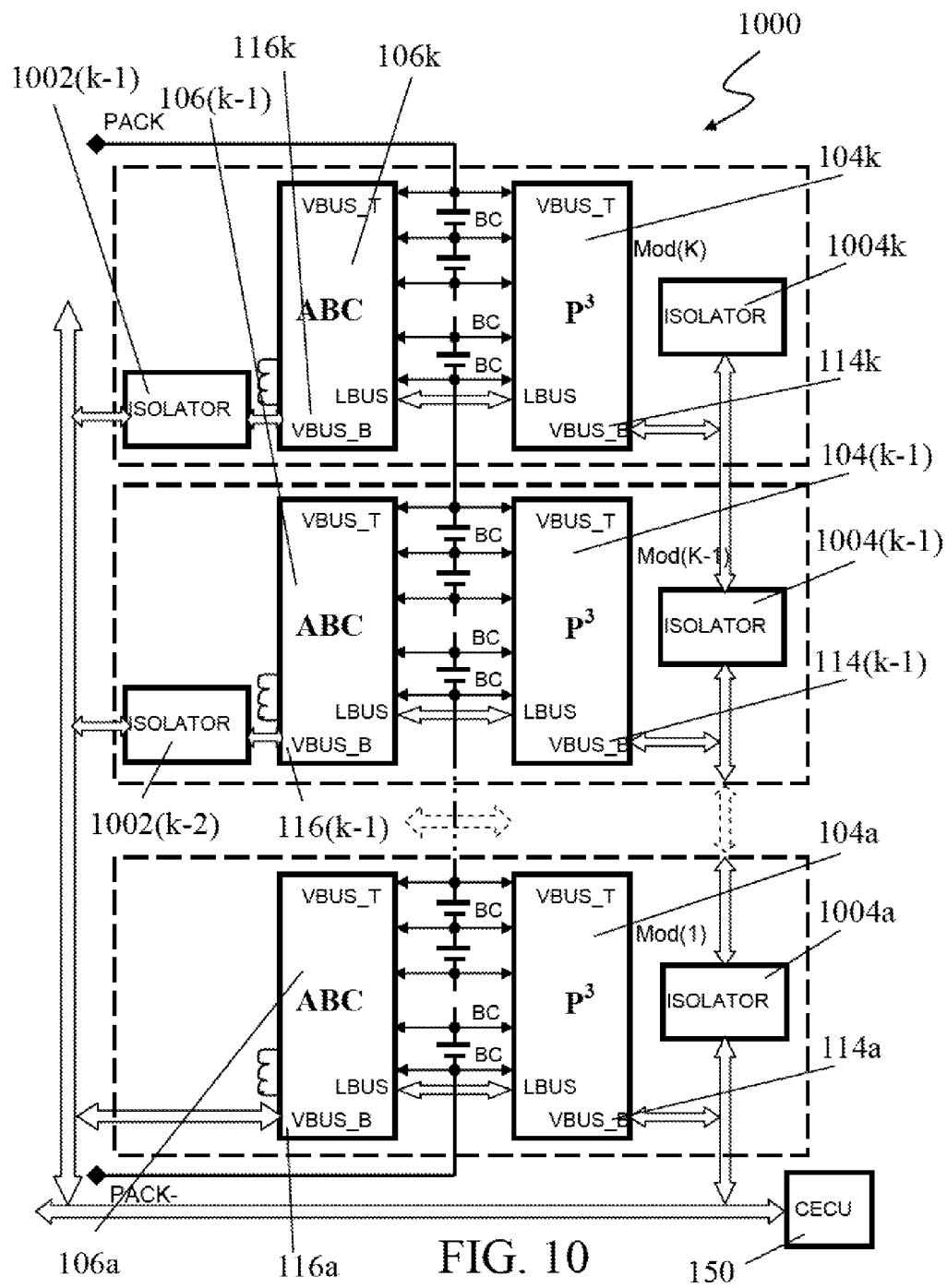
FIG. 10 depicts a control system with two set of isolators according to another embodiment of the present invention.

Referring to FIG. 10, it illustrates a control system 1000 according to another embodiment of the present invention. The control system 1000 shown in FIG. 10 is similar to the control system 800 shown in FIG. 8, and similar elements are indicated with same reference numerals. The control system 1000 in the FIG. 10 comprises a first set of a plurality of isolators 1002a, . . . 1002(k–2) and 1002(k–1) which are coupled to the vertical bottom bus interfaces 116b, . . . 116(k–1) and 116k of the active balancing controllers 106b, . . . 106(k–1), and 106k, and a second set of plurality of isolator 1004a, . . . 1004(k–1) and 1004k which are coupled to the vertical bottom bus interfaces 114a, . . . 114(k–1) and 114k of the processors 104a, . . . 104(k–1), and 104k. The first set of isolators 1002a, . . . 1002(k–2) and 1002(k–1) are coupled to each other in the star connection. The second set of isolators 1004a, . . . 1004(k–1) and 1004k are coupled to each other in the cascade connection. As shown in FIG. 10, the central electronic control unit 150 can access all the active balancing controllers 106a, . . . 106(k–1), and 106k through the isolators 1002a, . . . 1002(k–2) and 1002(k–1) and the vertical bottom bus interfaces 116a, . . . 116(k–1) and 116k of the active balancing controllers 106a, . . . 106(k–1), and 106k. The control system 1000 according to the embodiment of the present invention is also formed as an H-type bus and provides redundancy communication.

Figure 11:
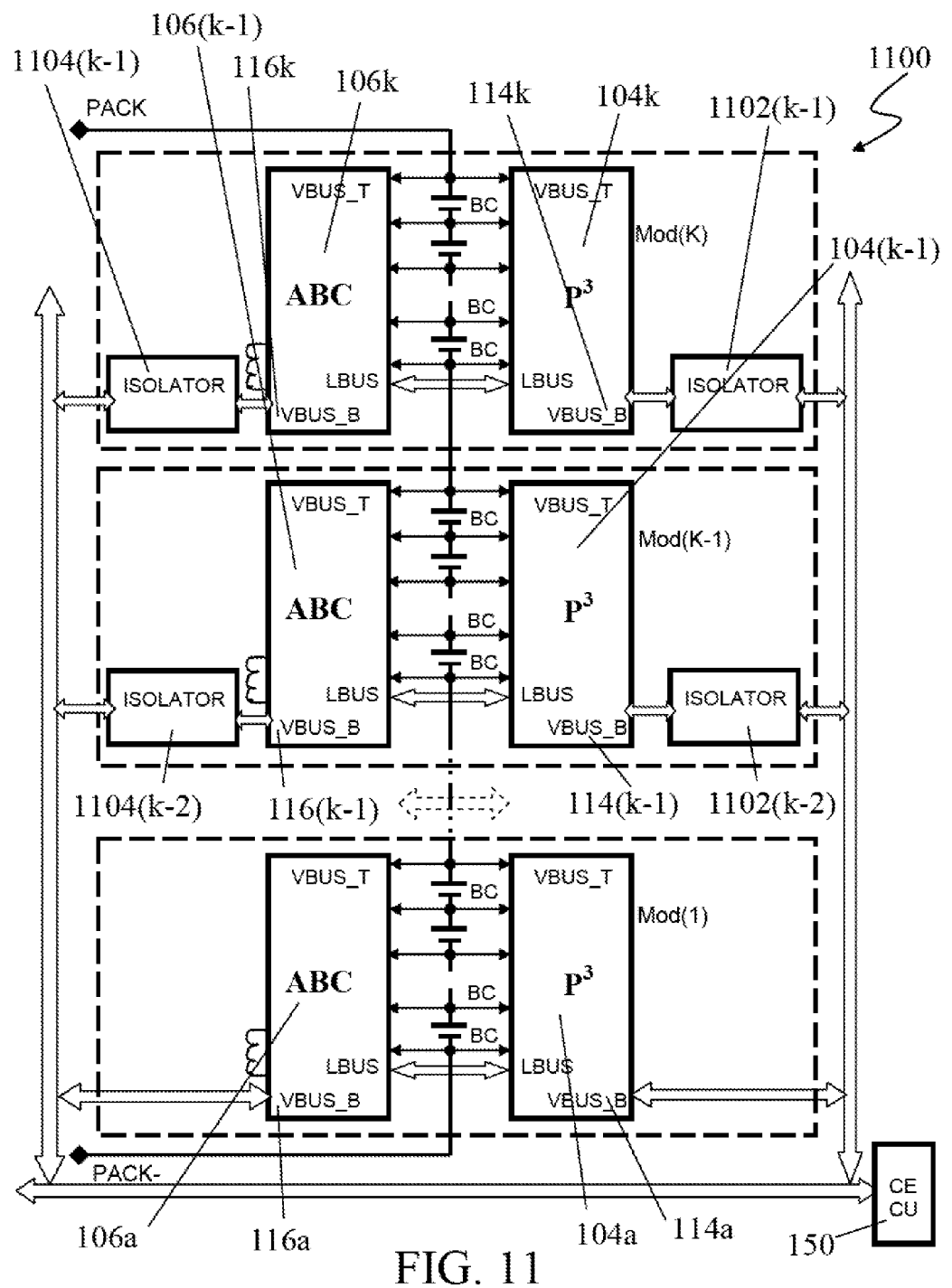
FIG. 11 depicts a control system with isolators in the star connection according to another embodiment of the present invention.

Referring to FIG. 11, it illustrates a control system 1100 according to another embodiment of the present invention. The control system 1100 shown in FIG. 11 is similar to the control system 800 shown in FIG. 8, and similar elements are indicated with same reference numerals. The control system 1100 in the FIG. 11 comprises a first set of a plurality of isolators 1102a, . . . 1102(k–2) and 1102(k–1) which are coupled to the vertical bottom bus interfaces 114b, . . . 114(k–1) and 114k of the processors 104b, . . . 104(k–1), and 104k, and a second set of a plurality of isolators 1104a, . . . 1104(k–2) and 1104(k–1) which are coupled to the vertical bottom bus interfaces 116b, . . . 116(k–1) and 116k of the active balancing controllers 106b, . . . 106(k–1), and 106k. The first set of isolators 1102a, . . . 1102(k–2) and 1102(k–1) are coupled to each other in the star connection and the second set of isolators 1104a, . . . 1104(k–2) and 1104(k–1) are coupled to each other in the star connection. The control system 1100 according to the embodiment of the present invention is also formed as an H-type bus and provides redundancy communication.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for diagnosing a control system for a stacked battery, the control system having a central unit in communication with a plurality of processors and a plurality of controllers, the plurality of processors being coupled in sequence and being in communication with the plurality of controllers through a plurality of lateral buses, the method comprising:
   a) sending diagnostic information from the central unit to a top processor of the plurality of processors;
   b) transmitting return information from the top processor of the plurality of processors to the central unit;
   c) comparing the diagnostic information sent from the central unit with the return information received by the central unit;
   d) indicating a communication problem if the diagnostic information sent from the central unit is different from the return information received by the central unit;
   m) identifying, by performing steps a) to d), a problematic bus where the communication problem occurs; and
   n) activating at least one bus of the plurality of lateral buses according to the identified problematic bus.

2. The method of claim 1, further comprising the steps of:
   f) sending the diagnostic information from the top processor of the plurality of processors to the controller with which it is in communication; and
   g) receiving the return information at the top processor of the plurality of processors from the controller with which it is in communication.

3. The method of claim 1, wherein the step a) further comprises:
   h) sending the diagnostic information from the central unit to a top controller of the plurality of controllers.

4. The method of claim 3, wherein the diagnostic information being sent from the central unit to the top controller of the plurality of controllers without passing through the plurality of processors.

5. The method of claim 3, further comprising the step of reconfiguring the control system for the diagnostic information to by-pass the plurality of processors.

6. The method of claim 1, wherein the step m) further comprises:
   i) sending diagnostic information from the central unit to a diagnostic processor of the plurality of processors;
   j) transmitting the diagnostic information from the diagnostic processor of the plurality of processors to the central unit that are below the diagnostic processor;
   k) comparing the diagnostic information sent from the central unit to the diagnostic processor with the diagnostic information received by the central unit from the diagnostic processor; and
   l) determining that the communication system below the diagnostic processor is in working condition when the diagnostic information sent from the central unit to the diagnostic processor is not different from the diagnostic information received by the central unit from the diagnostic processor.

7. The method of claim 6, wherein the top processor is one level higher than the diagnostic processor, and wherein the step m) further comprises:
   o) determining that communication between the diagnostic processor and the top processor is not in working condition if the following conditions occur:
   the diagnostic information sent from the central unit to the top processor is different from the return information received by the central unit from the top processor; and
   the diagnostic information sent from the central unit to the diagnostic processor is not different from the diagnostic information received by the central unit from the diagnostic processor.

8. A system for controlling a plurality of battery packs, each battery pack having a plurality of battery cells coupled in series, the system comprising:

a plurality of processors connected in sequence, each processor being in communication with an adjacent processor through a first bus;

a plurality of controllers, connected in sequence, for balancing loads of the plurality of battery cells, each controller being in communication with an adjacent controller through a second bus, and the plurality of controllers being in communication with the plurality of processors through a plurality of lateral buses; and a control unit for identifying a problematic bus having a communication problem, and reconfiguring communication path among the pluralities of processors and controllers by activating at least one bus of the plurality of lateral buses according to the identified problematic bus.

9. The system of claim 8, further comprising a plurality of isolators in communication with the plurality of processors and the control unit.

10. The system of claim 9, wherein the plurality of isolators being in communication with the plurality of processors are connected in a cascade fashion.

11. A system, for configuring communication path in a stacked battery, comprising:

a plurality of processors connected in sequence, each processor being in communication with an adjacent processor through a first bus;

a plurality of controllers connected in sequence, each controller being in communication with an adjacent controller through a second bus;

a plurality of lateral buses coupled between the plurality of processors and the plurality of controllers; and a control unit for sending diagnostic information through the plurality of processors and the plurality of controllers to identify a problematic bus having a communication problem, and for activating at least one bus of the plurality of lateral buses to by-pass the identified problematic bus.

12. The system of claim 11, wherein the each processor includes an analog digital converter for monitoring a condition of a plurality of battery cells in the stacked battery.

13. The system of claim 12, wherein a controller of the plurality of controllers balances loads of the plurality of battery cells in the stacked battery.

14. The system of claim 11, wherein the each controller comprises a top bus interface and a bottom bus interface, and wherein a first controller communicates with a second controller below the first controller through the bottom bus interface of the first controller, the second bus, and the top bus interface of the second controller.

15. The system of claim 11, further comprising:

a plurality of isolators coupled to the plurality of controllers, wherein two adjacent controllers of the plurality of controllers communicate with each other through one of the plurality of isolators.

16. The system of claim 15, wherein the each controller is coupled to an isolator of the plurality of isolators via the second bus.

17. The system of claim 15, wherein the isolators are coupled in a fashion that is selected from the group consisting of a star fashion and a cascade fashion.

18. The system of claim 11, wherein the each processor communicates with a controller of the plurality of controllers via a corresponding lateral bus of the plurality of lateral buses when the corresponding lateral bus is activated.

19. The system of claim 11, wherein if the communication problem occurs in the first bus between a first processor and a second processor that is one level lower than the first processor, the control unit communicates with the first processor through at least one controller of the plurality of controllers and through the activated at least one lateral bus.

20. The system of claim 11, wherein if the communication problem occurs in the second bus between a first controller and a second controller that is one level lower than the first controller, the control unit communicates with the first controller through at least one processor of the plurality of processors and through the activated at least one lateral bus.

* * * * *